(12) United States Patent
Parker

(10) Patent No.: US 6,666,532 B1
(45) Date of Patent: Dec. 23, 2003

(54) SNAP TOGETHER DRAWER PEDESTAL BASE

(75) Inventor: Brian G. Parker, Alto, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 0 days.

(21) Appl. No.: 10/117,697

(22) Filed: Apr. 5, 2002

(51) Int. Cl.[7] ............................................... A47B 46/00
(52) U.S. Cl. ............................... 312/249.11; 312/330.1
(58) Field of Search ........................... 312/257.1, 330.1, 312/265.5, 351, 348.6, 334.27, 334.31, 334.32, 263, 249.11

(56) References Cited

U.S. PATENT DOCUMENTS

| | | | | | |
|---|---|---|---|---|---|
| 5,944,398 | A | * | 8/1999 | Wu | ........................ 312/223.2 |
| 5,975,659 | A | * | 11/1999 | Yang et al. | ............... 312/223.2 |
| 6,394,563 | B2 | * | 5/2002 | Sugamura | ................ 312/257.1 |

OTHER PUBLICATIONS

Patent application Publication No. US 2003/0080654 A1 to Chen et al.; Publication Date May 1, 2003.*

* cited by examiner

*Primary Examiner*—Ramon O. Ramirez
(74) *Attorney, Agent, or Firm*—Warner Norcross & Judd LLP

(57) ABSTRACT

A drawer pedestal including a shell and a substructure that snap together. The substructure includes multiple locking tabs around a peripheral flange that interlock with slots defined by a peripheral rim of the shell so that the two pieces can be easily snapped together. At least one of the shell and the substructure include guide tabs to guide the two parts into the appropriate position for interlocking. The invention also provides a method for assembling the drawer pedestal including: positioning the substructure adjacent to the shell; aligning first and second locking structures on the substructure and shell; and moving at least one of the shell and the substructure toward one another until the first and second locking structure engages one another.

13 Claims, 11 Drawing Sheets

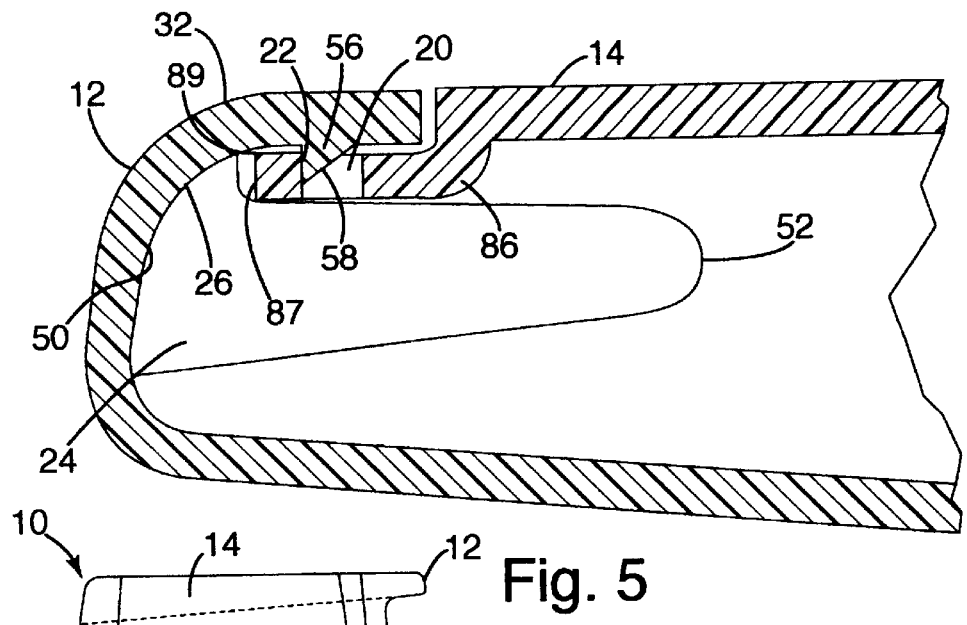
Fig. 5
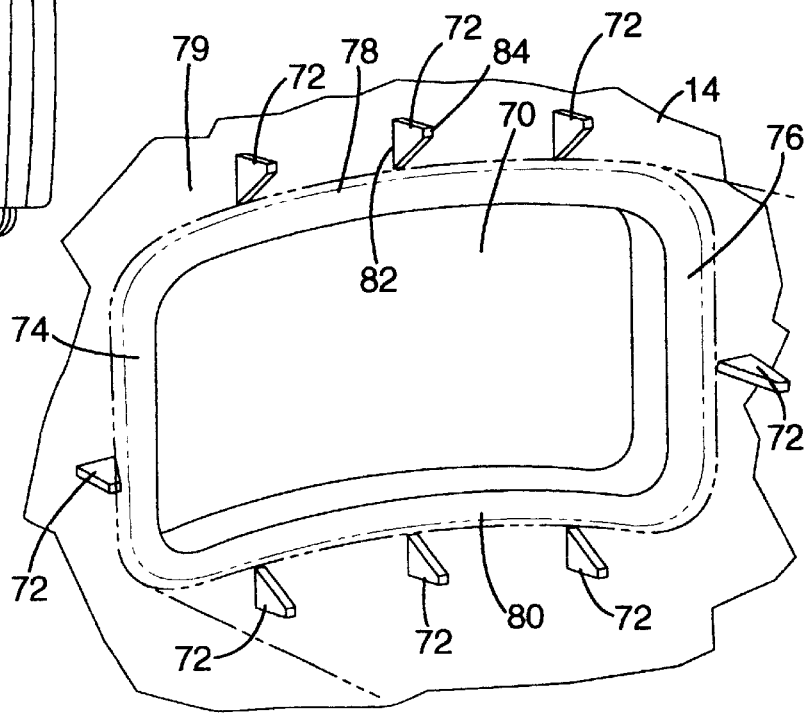
Fig. 6
Fig. 7

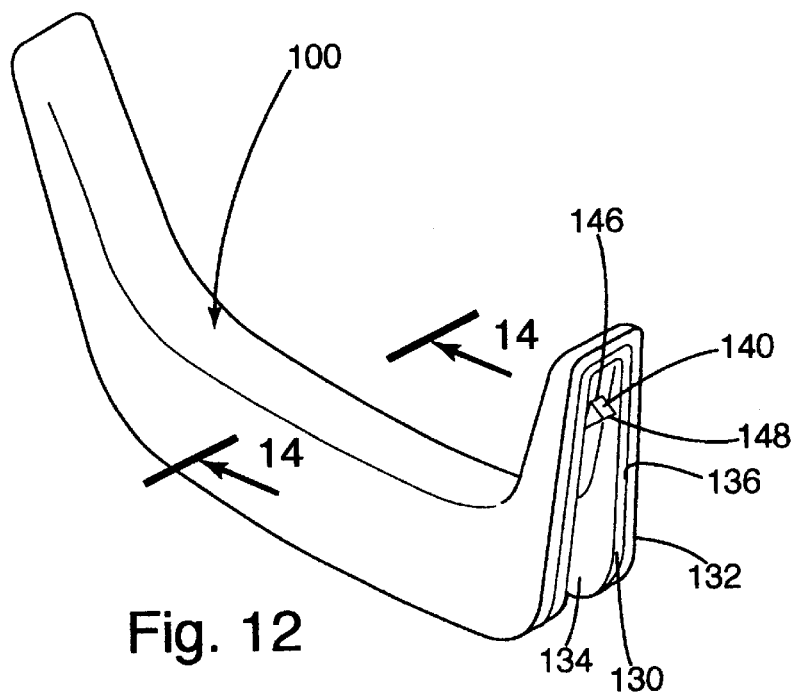
Fig. 12
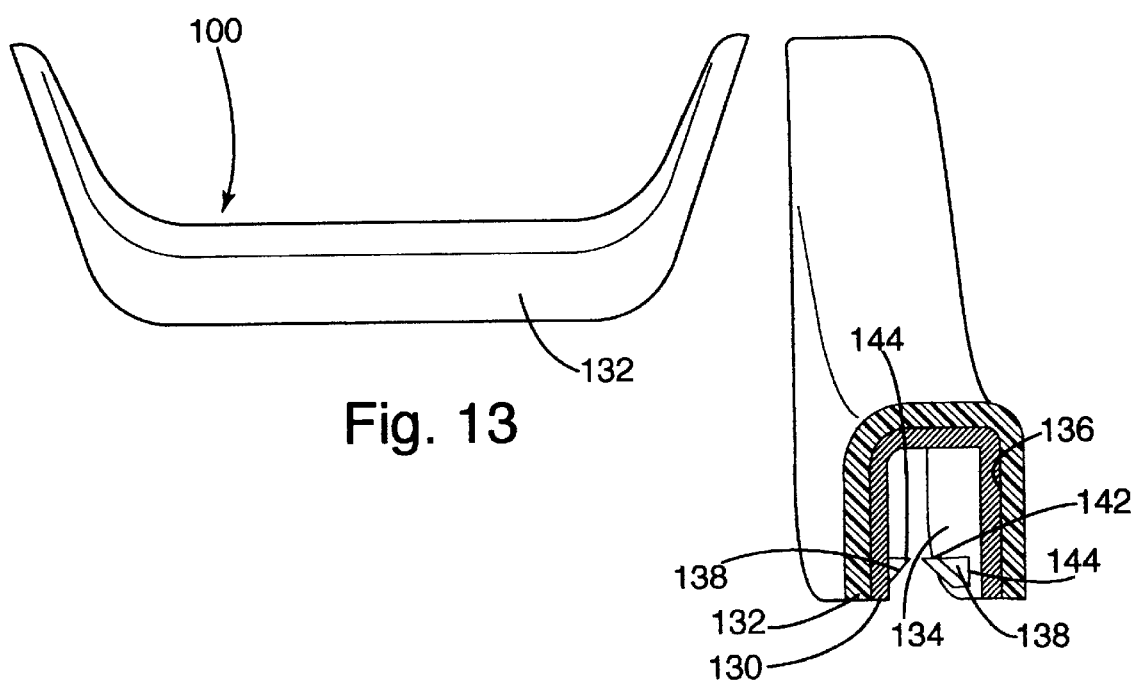
Fig. 13
Fig. 14

SNAP TOGETHER DRAWER PEDESTAL BASE

BACKGROUND OF INVENTION

The present invention relates to furniture and, more specifically, to drawer pedestals for office furniture.

Drawer pedestals are capable of increasing the storage space in office and home environments. Conventional drawer pedestals are constructed to either stand alone or be positioned under a desk, table or similar structure.

A typical drawer pedestal includes several drawers positioned one over the other in an open-faced box-like cabinet. The cabinet includes drawer slides fastened to its sidewalls. The drawers include rollers that interfit within the drawer slides to allow them to be individually slid in and out from the cabinet. Most of the components of the typical drawer pedestal are constructed of metal and fastened together with screws or bolts.

Although conventional drawer pedestals are capable of increasing storage space, they suffer a number of shortcomings. First, because the drawer components of the drawer pedestals are usually constructed from metal, the resulting unit is usually quite heavy. This makes shipping expensive, and makes movement of the pedestals around the office or home more difficult. Second, with various moving metal parts and fasteners to connect components, it is difficult and time consuming to assemble the drawer pedestals. Third, because the components are metal and relatively heavy, they usually do not withstand stacking, which makes storage of pre-assembly components space-consuming.

One solution to the problems associated with conventional metal drawer pedestals is to incorporate more plastic parts. This is done by replacing the metal panels of the drawer pedestal and drawers-with plastic panels. However, these plastic panels still are connected to one another with screws, bolts and other fasteners. These fasteners regularly are visible after assembly, leaving the finished product aesthetically unpleasing.

SUMMARY OF THE INVENTION

The aforementioned problems are overcome by the present invention wherein a plastic drawer pedestal is provided that includes an outer shell and a substructure that are snap-fit together.

In one aspect of the invention, the drawer pedestal unit includes a shell a substructure that interfits with the shell. The substructure has locking tabs or prongs around a flange. The shell includes corresponding slots or detents around a rim so that when the rim and flange are pushed together, the tabs and slots or detents engage one another and hold the parts together. Optionally, the slots or detents and tab or prongs may be disposed on either the shell or substructure.

In a variation of the first aspect, the locking tabs include are pairs or other select groups of side-by-side tabs. The slots are corresponding pairs or other select groups of relatively small apertures or detents into which the tabs snap and interlock to hold the shell and substructure together.

In a second aspect of the invention, guide tabs are included on the shell or substructure to assist a user in aligning and snapping the parts together.

The present invention also provides a method for assembling a drawer pedestal including: positioning the substructure adjacent the shell; aligning first and second locking structures on the substructure and shell; and moving at least one of the shell and the substructure toward one another until the first and second locking structure engages one another.

The drawer pedestal of the present invention offers many benefits. First, the invention improves upon existing plastic drawer pedestals by using a novel attachment mechanism including single or multi-tabbed interlocking structures and an easy-snap construction. By using interlocking structures including multi-tabbed locking tabs and corresponding, relatively small slots, as opposed to one large slot, a significant increase in the strength of the drawer pedestal is realized due to plastic processing limitations. Second, by eliminating, or at least reducing, the number of conventional fasteners used, the pedestal is less costly to produce, and has an improved finished look. Third, the components of the pedestal are constructed of relatively simple shapes that are conducive to easy stacking. Finally, the number of components of the pedestal is small, which decreases the overall cost of the unit.

These and other objects, advantages, and features of the invention will be readily understood and appreciated by reference to the detailed description of the preferred embodiment and the drawings.

BRIEF DESCRIPTION OF THE DRAWINGS

FIG. 5 is a cross-sectional view of the substructure interlocked with a shell of the drawer pedestal taken along line 5—5 of FIG. 1;

FIG. 6 is a right side elevational view of the drawer pedestal, the left side elevational view being a mirror image thereof;

FIG. 7 is a fragmentary perspective view of a shelf opening defined by the shell;

FIG. 12 is a perspective view of a handle of the drawer pedestal;

FIG. 13 is a front elevational view of the handle;

FIG. 14 is a cross-sectional view of the handle taken along line 14—14;

DETAILED DESCRIPTION OF THE PREFERRED EMBODIMENT

Figure 1:
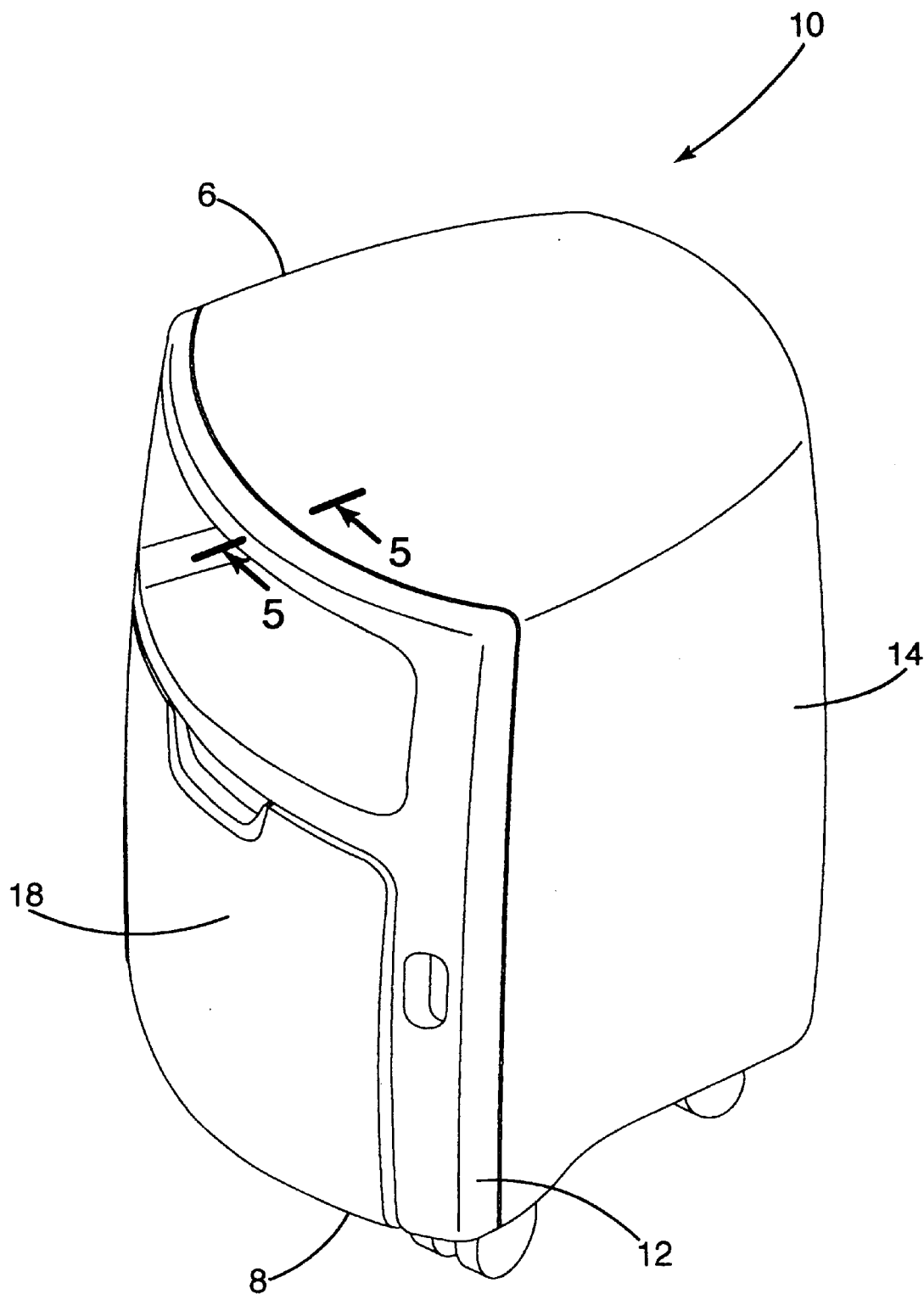
FIG. 1 is a perspective view of a drawer pedestal according to a preferred embodiment of the present invention.
Figure 2:
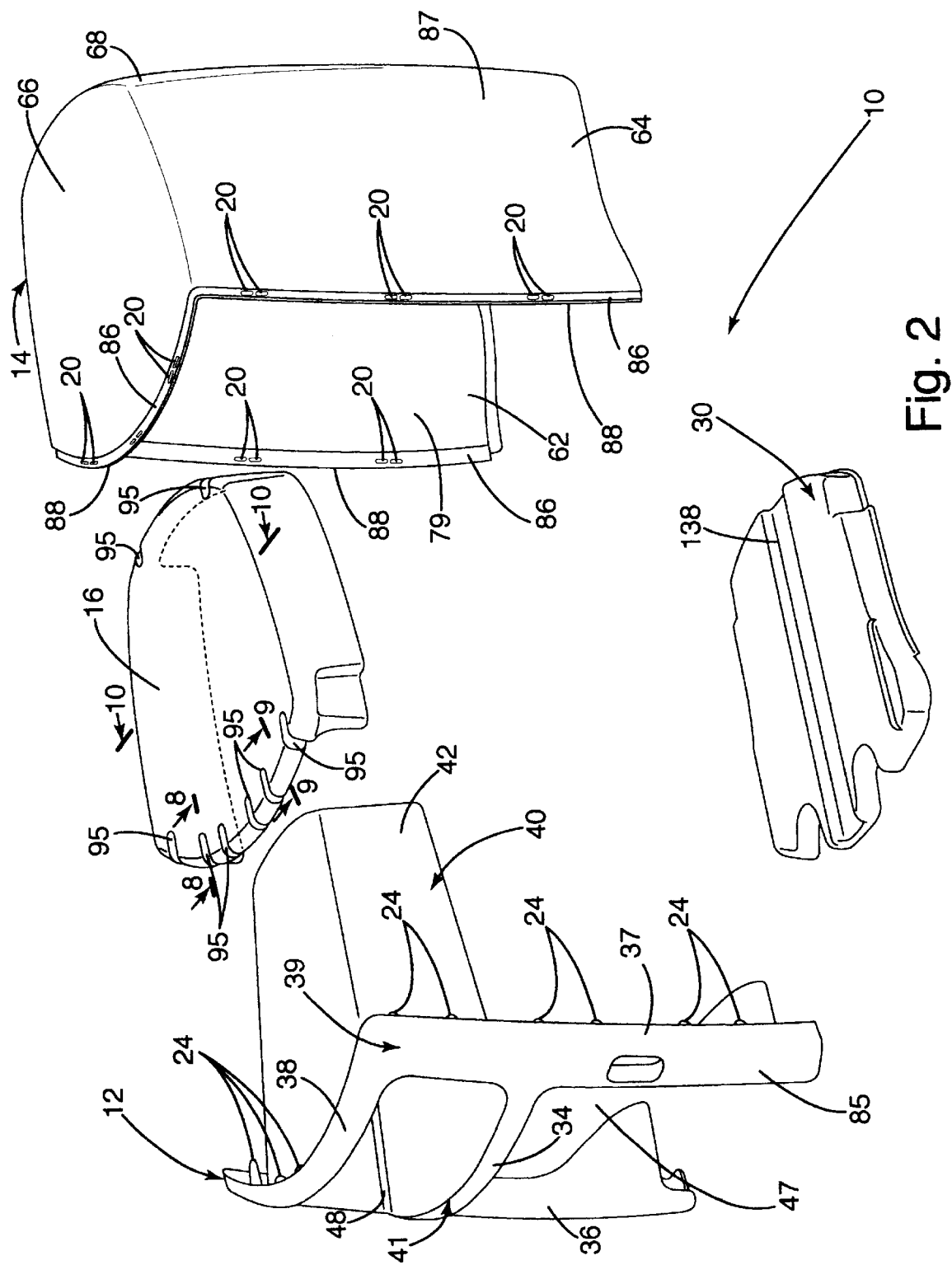
FIG. 2 is an exploded view of the drawer pedestal.
Figure 3:
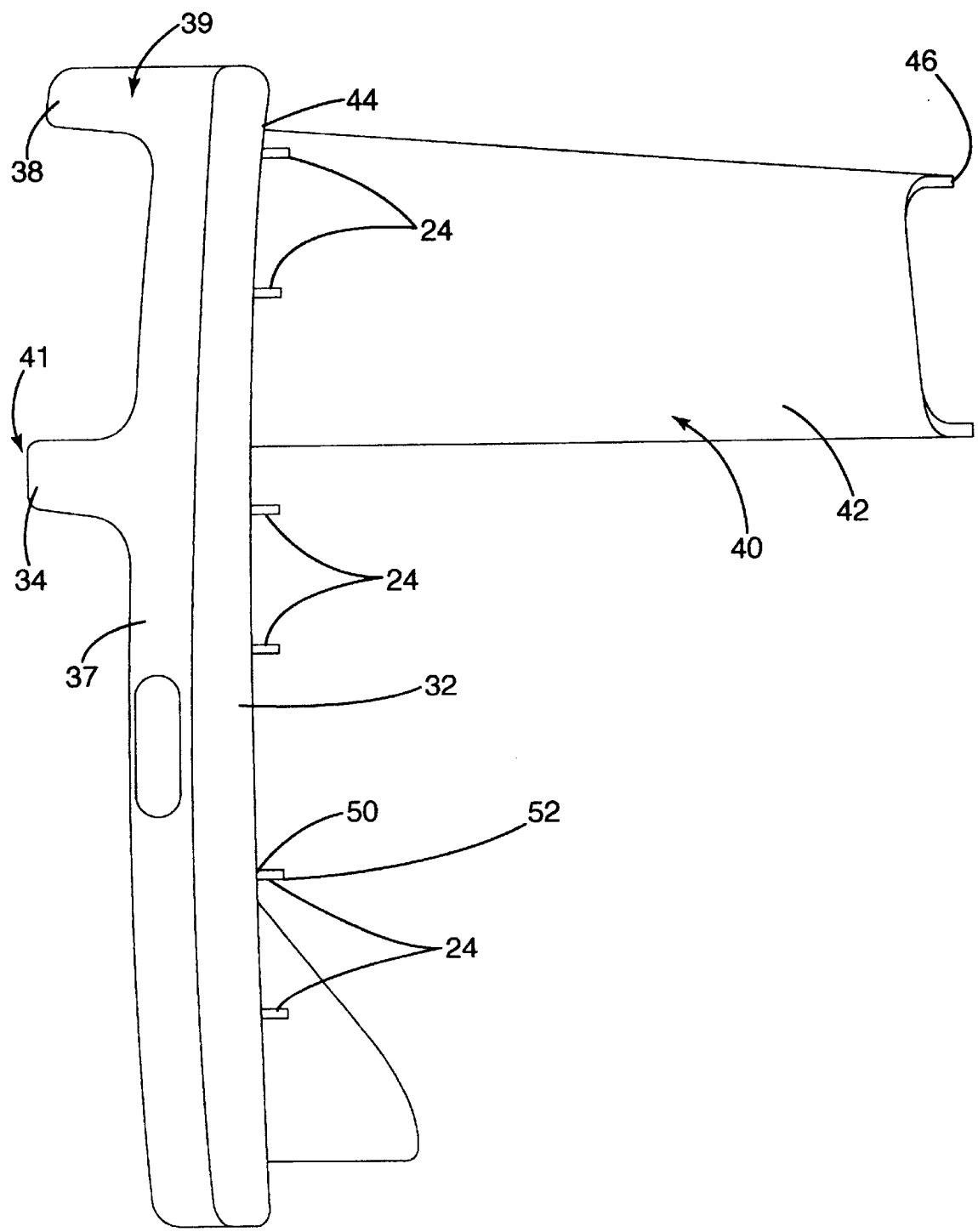
FIG. 3 is a left side elevational view of a substructure of the present invention.

A drawer pedestal 10 in accordance with a preferred embodiment of the present invention is shown generally in FIGS. 1 and 2. The pedestal 10 generally includes a top 6, a bottom 8, a substructure 12, a shell 14, and drawer 18. The shell 14 includes slots 20 and the substructure 12 includes locking tabs 22. The locking tabs 22 and slots 20, however, may be associated with either the shell 14 or substructure 12, in alternating or random combination. Locking tabs 22 interlock with slots 20 to hold the substructure 12 and shell 14 together. Optionally, a support 16 is interfit between the substructure 12 and the shell 14 to add rigidity and strength to the assembled drawer pedestal. Additionally, drawer 18 may be interfit within the assembled drawer pedestal. Although the present invention is described here in relation to a generally rectangular drawer pedestal, it is well suited for use with essentially any type of furniture unit of any shape. Moreover, the present invention may also be used in a variety of other products, for example, televisions, telephones, appliances, automotive trim and the like.

I. Construction

The components of the pedestal 10 are described in greater detail below with reference to FIGS. 2–19. In the preferred embodiment, the components are constructed from injection molded plastic, however other types of plastic, metal or other materials may be used as desired. Additionally, each component preferably is constructed as an integral piece, however, each component may be constructed from one or more separate parts as desired.

A. Substructure

Preferably, the substructure 12 includes a frame 39 and a compartment 40. The frame 39 has a left side 36 and a right side 37 connected by and upper member 38 and a center member 34. The upper member 38, center member 34, left side 36 and right side 37 form the front face 41 of the frame 39. Optionally, additional members may attach the left side 36 and right side 37 of the frame 39. Flanges 32 extend rearward from front face 41. Preferably, a portion of the frame 39 forms part of the external surface of the pedestal 10. The compartment 40 preferably includes compartment walls 42 bounded by a front compartment end 44 and a back compartment end 46. The compartment walls 42 preferably define an opening 48 in the substructure 12, and thus the pedestal 10 when assembled. In one embodiment, the compartment 40 resembles a tube. The front compartment end 44 of each compartment wall 42 is connected to a substructure internal surface 26 of the substructure 12. The back compartment end 44 of each compartment wall 44 is connected to the shell 14 as will be explained in greater detail below. When the pedestal 10 is assembled, the compartment 40 forms a contained shelf inside the pedestal 10.

The substructure internal surface 26 includes guide tabs 24 and locking tabs 22. The guide tabs 24 are molded as part of the substructure 12, but may also be separate components secured to the substructure internal surface 26. Each guide tab 24 is substantially flat and includes curved corners having a first guide end 50 and a second guide end 52. As will be appreciated, the guide tabs 24 may be other shapes. The first guide end 50 of each guide tab 24 preferably is secured to the substructure internal surface 26. Multiple guide tabs 24 are secured along the left side 36, right side 37 and upper member 38 of substructure 12, along the substructure internal surface 26. The second guide tab end 52 of each guide tab 24 extends beyond the flanges 32 of the substructure 12. Optionally, the guide tabs 24 may extend a distance less than or greater than the depth of flange 32 from substructure internal surface 26, depending on the application. Moreover, the guide tabs 24 may be connected to the substructure internal surface 26 of the center member 34 with a small gap between each guide tab 24 and the adjacent flange 32. The number, shape and positioning of the guide tabs 24 along the substructure 12 may be varied as desired. The guide tabs 24 primarily function to align the flange 32 of substructure 12 with rim 86 of the shell. As shown in FIG. 5, however, they may also or alternatively function to press the rim 86 toward the flange 32, thereby keeping the locking tabs 22 firmly interlocked or engaged with the slots 20.

Figure 4:
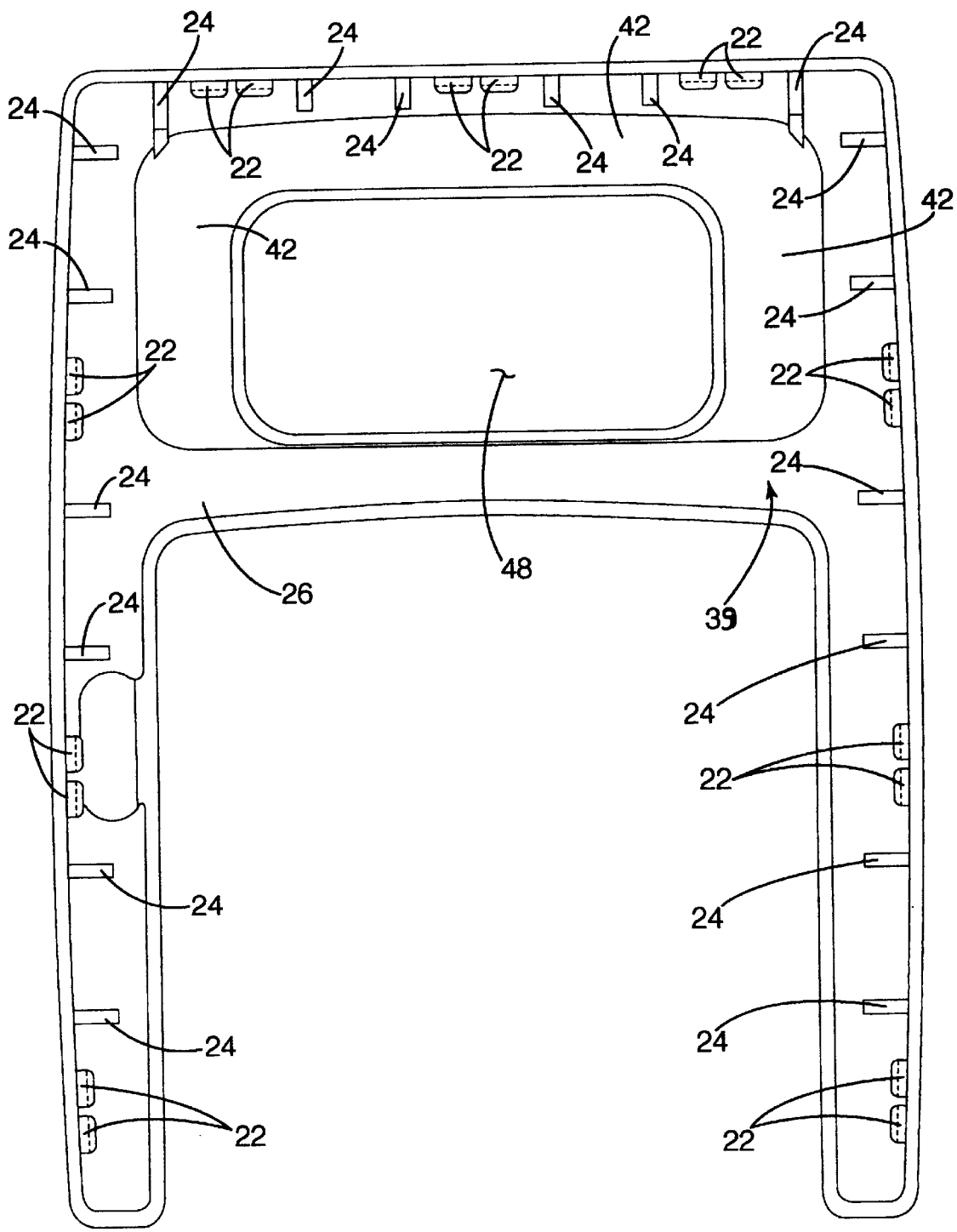
FIG. 4 is a rear elevational view of the substructure.

As shown in FIGS. 4 and 5, the substructure 12 includes locking tabs 22, preferably attached to the substructure internal surface 26 on or near flange 32. Each locking tab includes an angled front face 58 which facilitates moving the locking tab 22 over the corner 89 of rim 86 as the substrate 12 and shell 14 are mated. Optionally, the front face 58 may be curved to perform this function. The base 56 of tab 22 is secured to the substructure internal surface 26. The locking tab 22 may be resilient to facilitate entry into slot 20 on shell 14. In a preferred embodiment, the locking tabs 22 are attached to the substructure 12 in adjacent groups, and more preferably in pairs. Optionally, the tabs and slots are grouped in discrete pairs, that is, the distance between the two tabs or slots in a pair is less than the distance between adjacent pairs of tabs or slots. Optionally, groups of tabs and slots of other numbers may be used as desired. The locking tabs 22 are either molded as part of the substructure 12 or molded in pairs in the configuration explained above as separate parts and attached to the substructure 12 by any conventional means.

B. Housing

Referring to FIGS. 2, 6 and 7, the shell 14 preferably includes a left shell wall 62, a right shell wall 64, a top shell wall 66, and a back shell wall 68. The shell 14 preferably is rigid enough to be self-supporting, that is, to stand firmly by itself. A compartment opening 70, compartment guide tabs 72 and slots 20 preferably are included in the shell 14. If a base panel 30 is used, it is attached to the bottom of each of the left shell wall 62, right shell wall 64, and back shell wall 68. The base panel 30 may be attached to the pedestal 10 with the interlocking structures defined herein, or with any conventional fastener, for example screws, bolts or glue.

The shell 14 optionally includes compartment guide tabs 72, which have a base end 82 and a tip 84. The compartment guide tabs 72 preferably function to guide compartment 40 into compartment opening 70. The compartment guide tabs 72 are preferably shaped like a right triangle, but other shapes may be used as desired. The compartment guide tabs 72 are attached to the shell 14 along the perimeter of shelf opening 70. Any number of compartment guide tabs 72 may be attached to shell 14 in the following manner. Each compartment guide tab 72 is attached to the shell internal surface 79 so that the tip 84 of each compartment guide tab 72 is the point on the compartment guide tab 72 farthest from the compartment opening 70. Preferably, there are several compartment guide tabs 72 along each of the left opening edge 74, right opening edge 76, top opening edge 78 and bottom opening edge 80 of the compartment opening 70.

With reference to FIG. 2, each of the left shell wall 62, right shell wall 64 and top shell wall 66 of the shell 14 includes a rim 86 having a peripheral edge 87. The rim 86 may be associated with each of the walls collectively or independently. Preferably, the rim 86 is less thick than the left shell wall 62, right shell wall 64 and top shell wall 66.

The rim 86 is substantially continuous with the shell internal surface 79 of the adjoining wall.

The rim defines slots 20 at or adjacent to the edge 87. These slots preferably are dimensioned to receive the locking tabs 22 of the substructure and thereby interlock the shell 14 and substructure 12.

The slots also are preferably grouped together in preselected numbers. For example, slots 20 may be grouped together in pairs as shown in FIG. 2. Groups of relatively short slots, for example, pairs of slots or three or more slots, are preferred over longer single slots that traverse the same length of the rim or edge as the groups of relatively short slots. The reason being that as the region of the rim 86 between the slot 20 and the peripheral edge 87 becomes longer, i.e., extends a greater length along or parallel to the rim 86, it becomes more flexible and/or weaker and thus prone to breaking. In contrast, the use of groups of closely situated slots 20, for example, pairs of slots, as opposed to one large slot, results in stronger regions between the slot and edge and thus a stronger bond between the edge 86 and flange 32 when tabs 22 are interlocked with the slots.

Additionally, groups of relatively short slots are more easily and strongly formed in plastic forming processes, for example, injection molding. Specifically, in an injection molding process, the groups of short slots promotes stronger knit lines around each slot, thereby increasing the structural integrity of the rim around and between individual slots in the finished product. Moreover, with groups of shorter slots, the region of the rim 86 between the slot 20 and the edge 87 is more likely to be completely formed than a relatively longer slot. Specifically, groups of shorter slots are less likely to short-out in injection molding than single, long slots.

The groups of slots (and/or locking tabs) may be "independent" as desired, that is, the distance between separate groups of slots is greater than the distance between adjacent slots in each of the groups. Optionally, the slots also may be arranged in discrete pairs as discussed above.

In a preferred embodiment, the number of slots 20 is equal to the number of locking tabs 22. Additionally, the thickness of the rim 86 is such that when the locking tabs 22 are connected to the slots 20, the substructure external surface 85 is continuous or in substantially the same plane as the shell external surface 87.

C. Support

Figure 8:
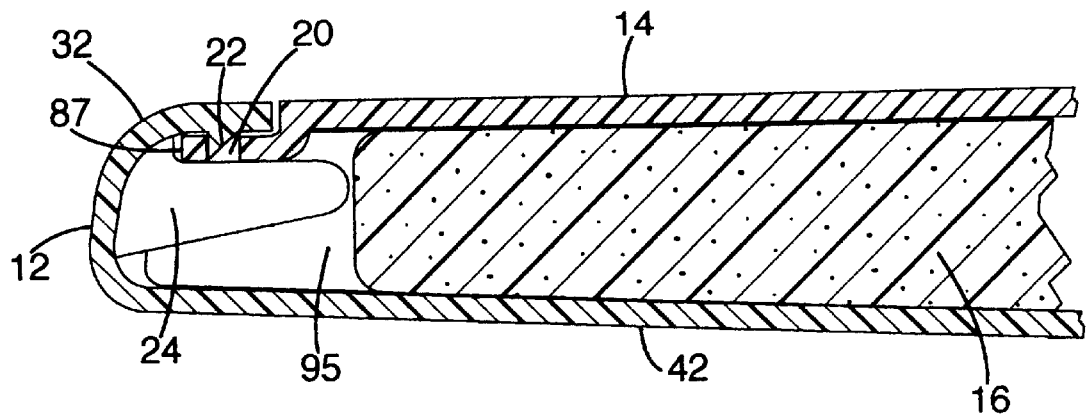
FIG. 8 is an unexploded, cross-sectional view of a support of the drawer pedestal and the shell taken along line 8—8 of FIG. 2.
Figure 9:
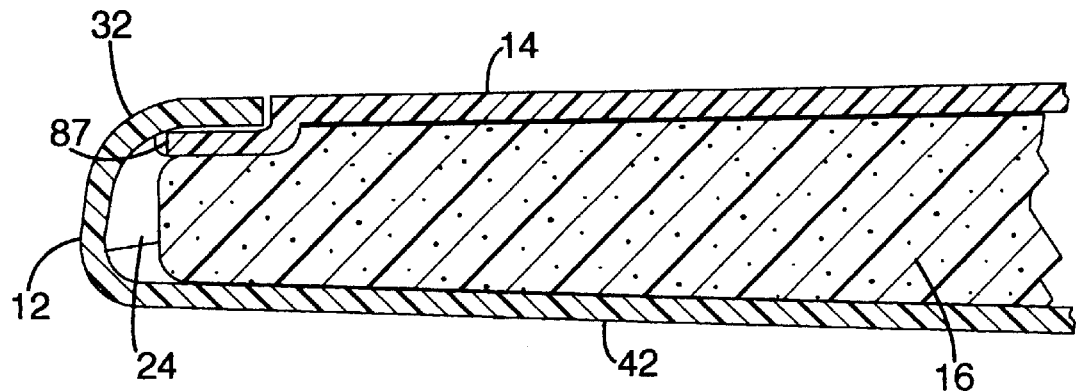
FIG. 9 is an unexploded, cross-sectional view of the support and the shell taken along line 9—9 of FIG. 2.
Figure 10:
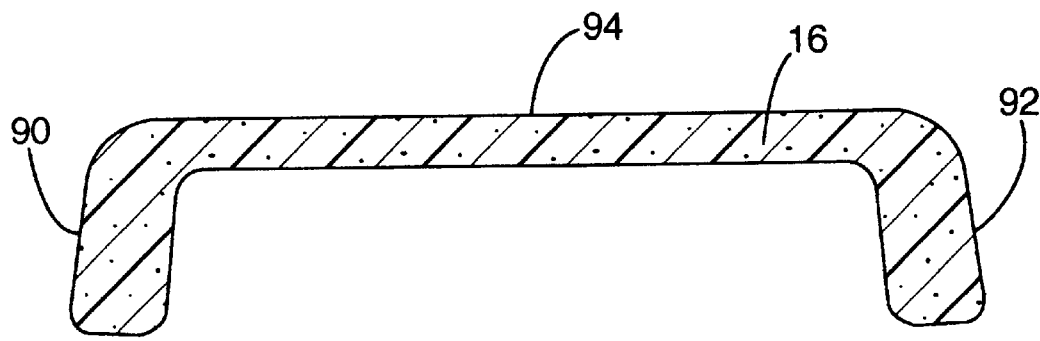
FIG. 10 is a cross-sectional view of the support taken along line 10—10 of FIG. 2.
Figure 11:
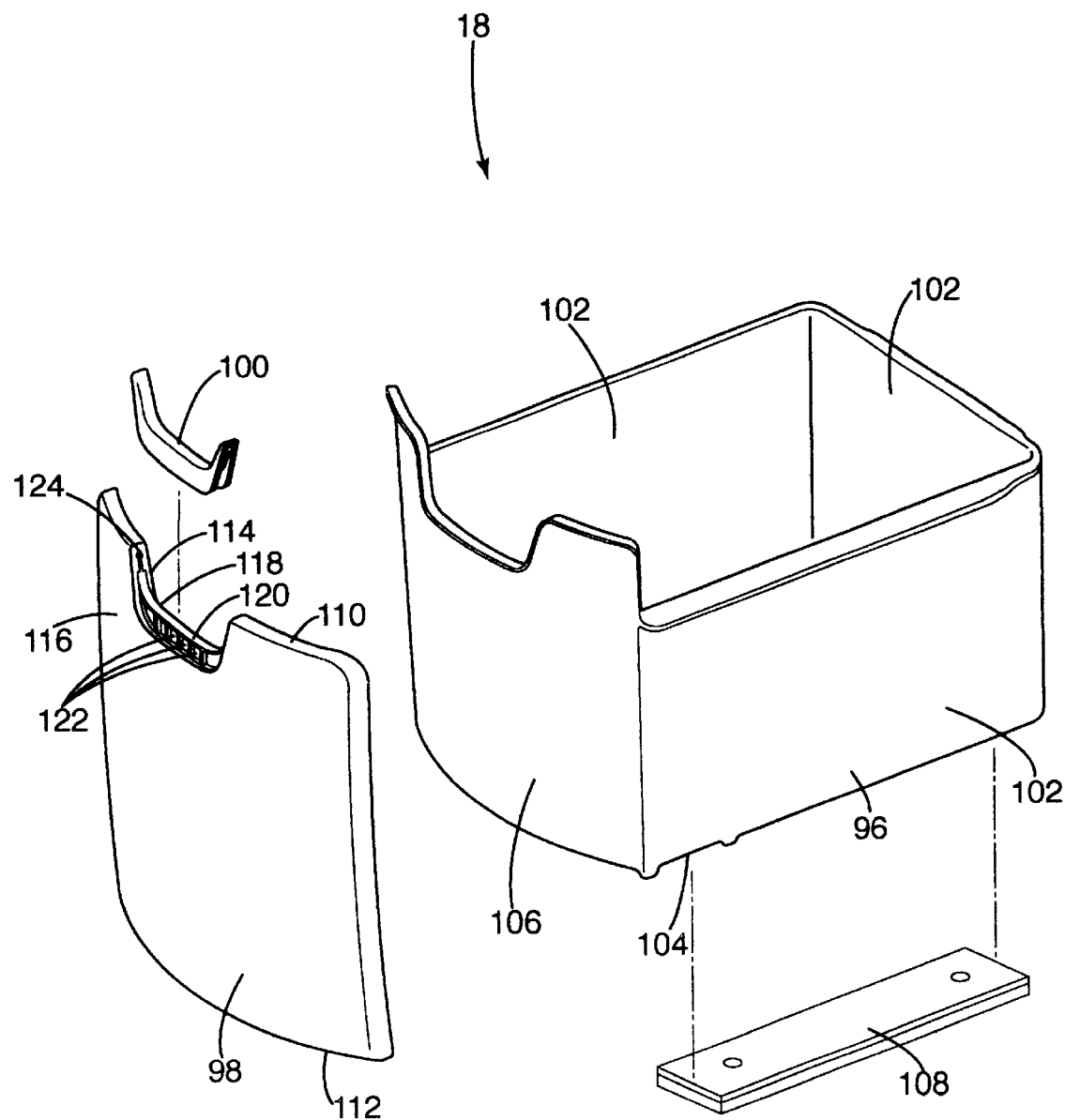
FIG. 11 is an exploded view of a drawer of the drawer pedestal.

Optionally, the pedestal 10 further includes support 16, as shown in FIGS. 8–10. FIGS. 8 and 9 show a cross-section of the pedestal 10 at the point of connection between the substructure 12 and the shell 14 including the support 16. FIG. 10 shows a cross-section of the support 16 itself. The support 16 includes a left support panel 90, a right support panel 92, and a top support panel 94. The support 16 defines guide tab openings 95 to receive guide tabs 24 when the support 16 is positioned over the compartment 40. The support 16 may be constructed from any material with sufficient strength to support objects placed on the top shell wall 66 of the pedestal 10, for example, plastic, rubber and polystyrene foam.

The left support panel 90, right support panel 92 and top support panel 94 cooperate to form a cross-section that fits over a portion of the compartment 40 so that each of the left support panel 90, right support panel 92 and top support panel 94 contacts a portion, preferably substantially all, of the compartment wall 42. Additionally, the top support panel 94 contacts a portion, preferably substantially all, of the shell internal surface 79 of the top shell wall 66 of the shell 14 when the pedestal 10 is assembled. The support 16 may function to transfer loads from the top shell wall 66 to the compartment 40 and further to the substructure 12 and other walls of the shell 14. The support 16 preferably is frictionally fit between the compartment 40 and the shell 14, but may be secured with conventional adhesives.

D. Drawer and Handle

Referring to FIGS. 11–16, an optional drawer 18 is interfit within the assembled pedestal 10. The drawer 18 includes a drawer box 96, front drawer panel 98 and handle 100. The drawer box 96 is generally rectangular and includes drawer side walls 102, a drawer bottom wall 104 and a drawer front wall 106. A drawer slide 108 is mounted on the drawer bottom wall 104 and slidably fits within the guide groove 138 of the base panel 30 to allow the drawer 18 to be extended and retracted in relation to the pedestal 10. As will be appreciated, other structures to facilitate movement of the drawer 18 relative to pedestal 10 may be used as desired.

The front drawer panel 98 includes top panel end 110 and a bottom panel end 112, and an internal panel side 114 and an external panel side 116. The internal panel side 114 of the front drawer panel 98 is attached to the drawer front wall 106 of the drawer box 96. The front drawer panel 98 may be attached to the drawer box 96 by any conventional means. The front drawer panel 98 defines a U-shaped recess 118 along the top panel end 110. A rib 120 protrudes from the recess 118. The rib 120 includes a number of pockets 122, which add strength to the rib 120. Pockets 122 are located on both the internal panel side 114 and the external panel side 116. Any number of pockets may be used as desired.

Figure 15:
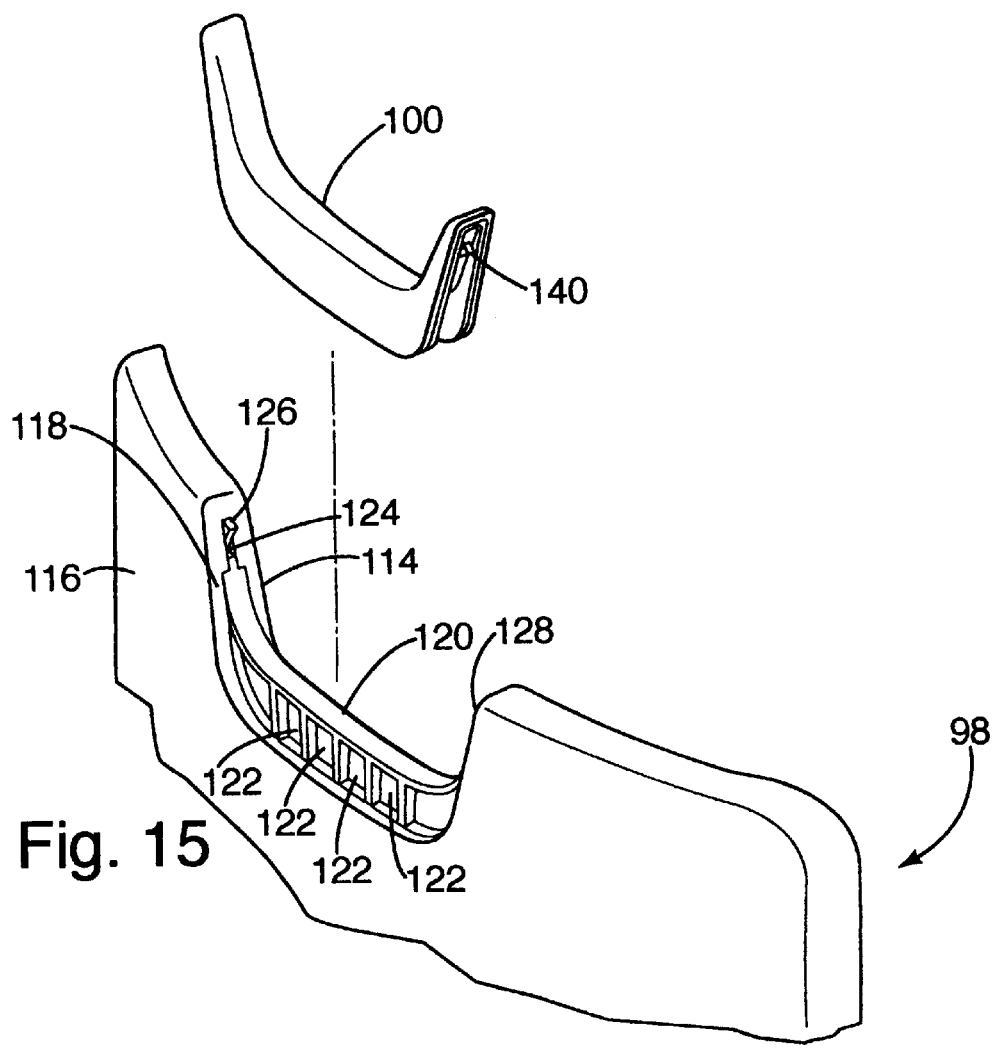
FIG. 15 is an exploded view of the handle and the drawer.
Figure 16:
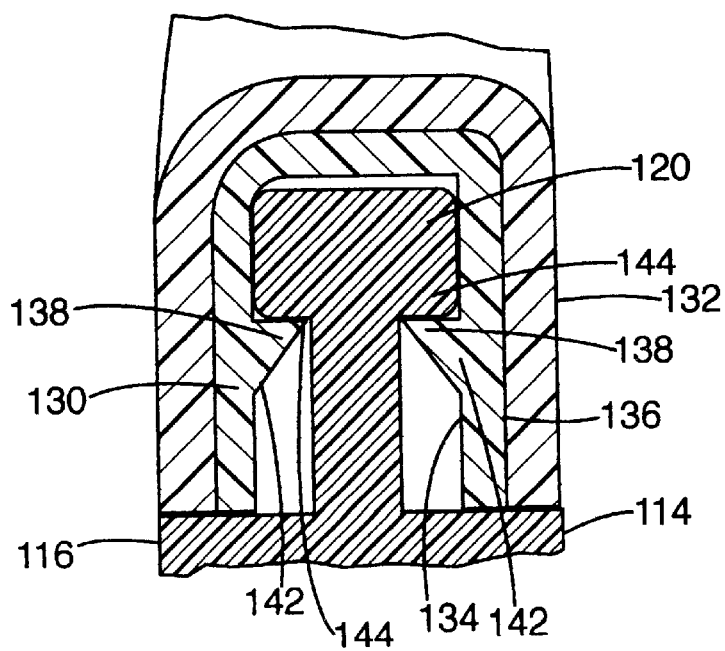
FIG. 16 is a cross-sectional view of the handle secured to the drawer.

With further reference to FIG. 15, the front drawer panel 98 includes snaps 124 on the left recess side 126 and right recess side 128 of the recess 118. Any number of snaps 124 may be used, but in a preferred embodiment there is one snap 124 on each of the left recess side 126 and right recess side 128 of the recess 118. The snaps 124 are located in the top half of each of the left recess side 126 and right recess side 128 of the recess 118.

With reference to FIGS. 12–14, the handle 100 includes a substrate 130 and a molding 132. Preferably, the substrate 130 is made from any material with sufficient strength to be snapped onto the front drawer panel 98 and the substrate 130 is formed from a grippable plastic. The substrate 130 includes a substrate inner surface 134 and a substrate outer surface 136. The substrate 130 has generally a U-shaped cross-section to adequately interlock over the rib 120.

Additionally, the substrate 130 includes teeth 138 and catches 140. The base 142 of each tooth 138 is attached to the substrate inner surface 134 so that when the substrate 130 is placed over the rib 120, the tip 144 of each tooth 138 interlocks with a pocket 122. Preferably, the rib 120 includes at least as many pockets 122 as there are teeth 138 on the substrate 130.

Catches 144 are located on the substrate inner surface 134. Each catch includes a catch base 146 and a catch tip 148. The catch base 146 of each catch 140 is attached to the substrate inner surface 134 of the substrate 130 so that when the substrate 130 is placed over the rib 120, the catch tip 148 of each catch 140 interlocks with a snap 124 on the front drawer panel 98. The front drawer panel 98 includes at least as many snaps 124 as there are catches 140 on the substrate 130, and in a preferred embodiment the number of snaps 124 is equal to the number of catches 140.

The molding 132 is attached along substantially the entire substrate outer surface 136 of the substrate 130. The molding 132 may be made of any material capable of being attached to the substrate 130, but in a preferred embodiment the material is a textured plastic. The use of such material improves the feel and grip-ability of the handle 100. The molding 132 is preferably injection molded over the substrate outer surface 136 of the substrate 130.

II. Method of Assembly

To assemble a pedestal 10, the base panel 30 is secured to the shell 14. The support 16 is placed on top of the compartment 40. The substructure 12 is inserted into the outer shell 14. The guide tabs 24 align the locking tabs 22 with slots 20 so that the two may be secured along the rim 86 and flanges 32 to interlock the substructure 12 and shell 14. Additionally, the compartment guide tabs 72 align the compartment 40 with the compartment opening 70. To further aid with alignment, the guide tabs 24 and compartment guide tabs 72 are guided into the openings 95 on the support 16. When the substructure 12 is fully inserted into the shell 14, the locking tabs 22 interlock with the slots 20. In this interlocked configuration, the support 16 is frictionally trapped between compartment 40 and shell 14.

The handle 100 is assembled by forming a substrate 130 with teeth 138 and catches 140. The molding 132 is attached to the substrate 130. The drawer 18 is assembled by attaching the internal panel side 114 of the front drawer panel 98 to the front drawer wall 106 of the drawer box 96. The handle 100 is pushed onto rib 120 until the teeth 138 interlock with pockets 122 and catches 140 interlock with snaps 124. With the pedestal 10 assembled, the drawer 18 is interfit through drawer aperture 47. Drawer slide 108 is slidably positioned in slide groove 138 of base panel 30.

III. First Alternative Embodiment

Figure 17:
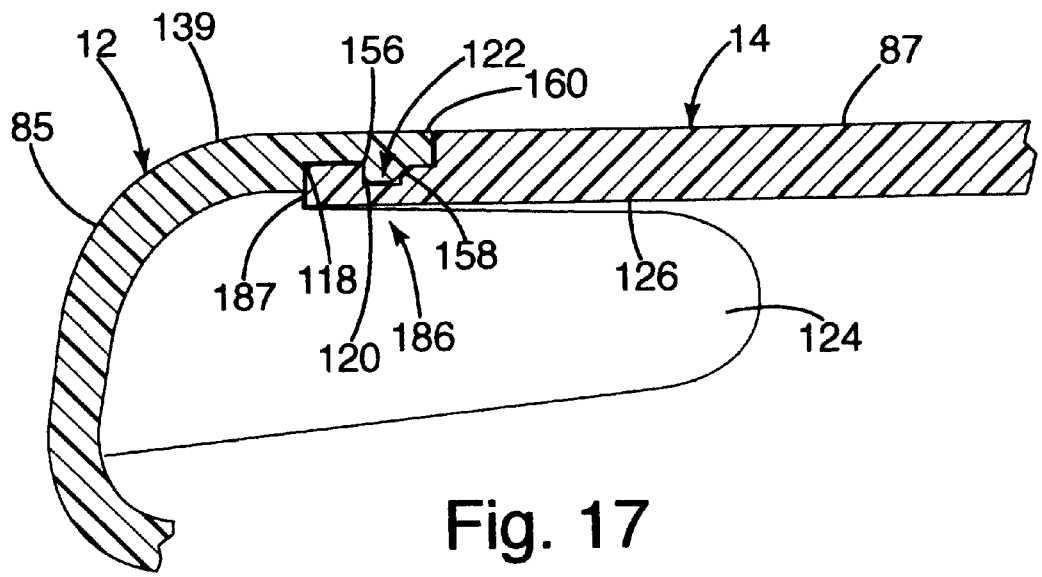
FIG. 17 is a cross-sectional view of a first alternative embodiment of an interlocking structure of the drawer pedestal.
Figure 18:
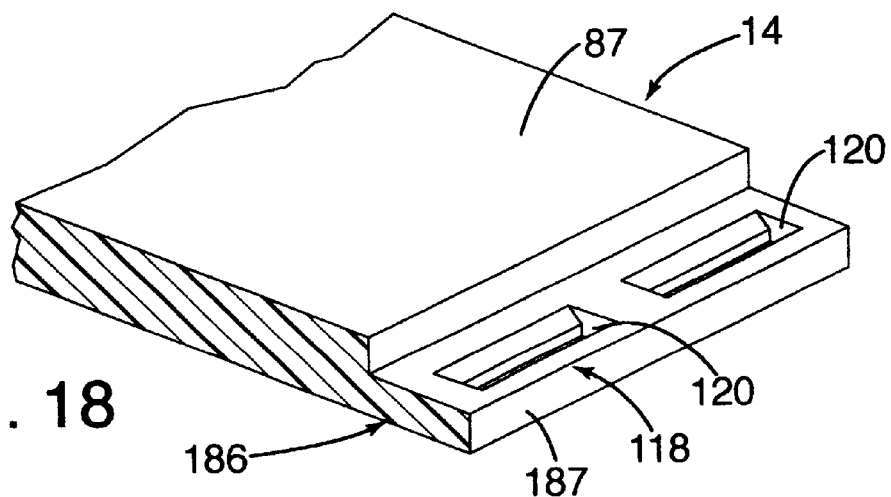
FIG. 18 is a perspective view of a first portion of the alternative interlocking structure.
Figure 19:
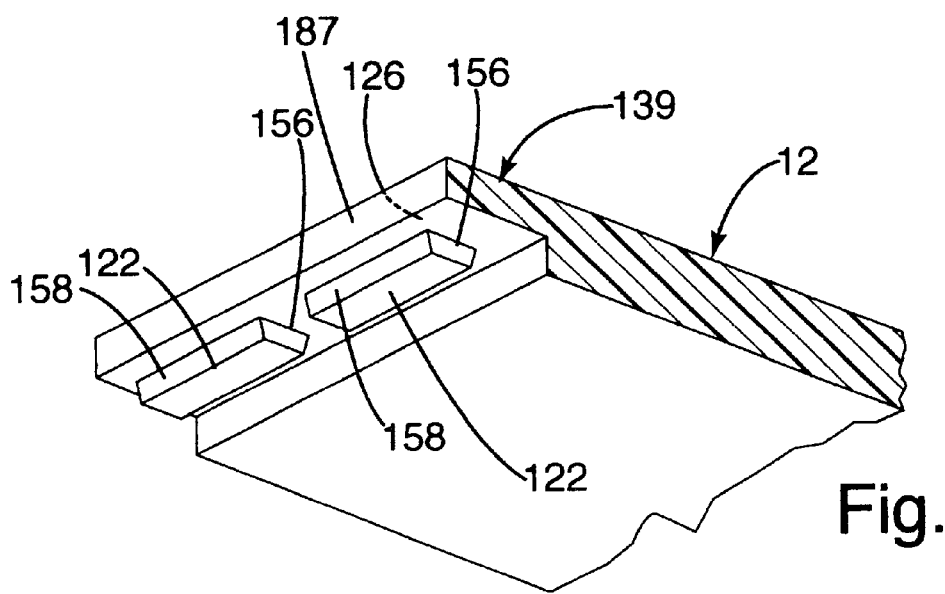
FIG. 19 is a lower perspective view of another portion of the interlocking structure.

A first alternative embodiment of the interlocking structures of FIG. 5 is shown in FIGS. 17–19. These alternative interlocking structures generally include a locking tab 122 that interlocks with a detent 120. As with the preferred embodiment, the locking tabs 122 and detents 120 are in corresponding pairs, specifically, two locking tabs 122 register and interlock two corresponding detents 120. However, each interlocking structure may include only a single locking tab 122 and single corresponding detent 120, or any number of locking tabs 122 mated with any of the same number of detents 120, as the application requires.

Each locking tab 122 includes a base 156 secured or integral with the flange 132 of the substructure 12. The front face 158 of the locking tab 122 preferably is angled or curved to facilitate pushing the locking tab 122 and flange 132 over the corner 118 of the rim 186 during assembly. The locking tabs 122 shown also include additional support structure adjacent the front face 158 than the preferred embodiment. The detent 120 is defined at or adjacent the rim 186 of the shell 14. The detents are shown as recesses that do not pass completely through the rim 186. However, these detents may be replaced with slots that form an aperture completely through the rim. As used herein, slot may mean either "slot" or "detent" or both "slot" and "detent."

Detents 120 receive corresponding locking tabs 122 to interlock the rim 186 to the flange 132, thereby securing the shell 14 and substructure 12 together. Preferably, the locking tab 122 interfits within the detent 120 so that the shell external surface 87 and substructure external surface 85 are in substantially the same plane so that the finished pedestal appears smooth over the seam 160. Although shown with the locking tabs 122 on the substructure 12 and the slots 120 defined by the shell 14, the tabs and slots may be positioned on the other component. For example, the slots may be associated with the substructure and the tabs associated with the shell. Tabs and slots optionally may alternate, so that substructure and shell both include slots and detents in any order.

IV. Second Alternative Embodiment

Figure 20:
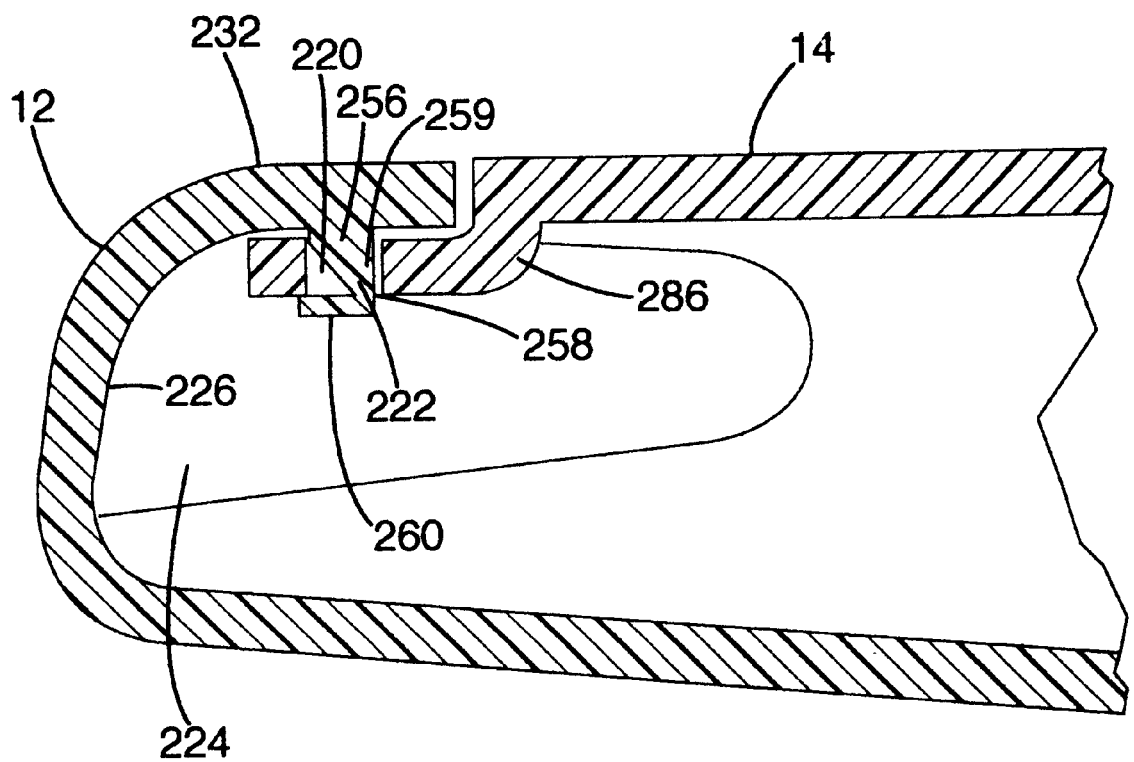
FIG. 20 is a cross-sectional view of a second alternative embodiment of the interlocking structure.

A second alternative embodiment of the interlocking structures shown in FIG. 5 is shown in FIG. 20. These second alternative interlocking structures generally include a locking tab 222 that interlocks with a slot 220. Each locking tab 222 includes a base 259 and a member 260. The base 259 has a first base end 256 and a second base end 258. The first base end 256 is secured to the substructure internal surface 226. The member 260 preferably is resilient and protrudes from the second base end 258. When the locking tab 222 is positioned over and urged into a slot 220, the member 260 and/or the base 259 flexes to allow entry of the member 260 into the slot 220, the member 260 and/or the base 259 flexes to allow entry of the member 260 into the slot 220. The locking tabs 222 and slots 222 of this second alternative embodiment may be grouped as in the other embodiments of the present invention.

The above description is that of preferred embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said" is not to be construed as limiting the element to the singular.

The embodiments of the invention in which an exclusive property or privilege is claimed are defined as follows:

1. An article of furniture comprising:
   a shell including a rim bounded by a first edge and a plurality of walls cooperating to define a cavity;
   a substructure including a flange bounded by a second edge; and
   interlocking means integral with said shell and said substructure for interlocking said rim and said flange so that said shell and said substructure are secured to one another, said interlocking means including a plurality of tabs and a plurality of corresponding slots, said slots arranged in groups so that adjacent slots in each group are separated by a bridge extending inward from at least one of said first and second edges, the bridge of a width less than the distance between adjacent groups of slots, said interlocking means further including face means for slidably guiding said tabs over at least one of said first and second edges when said rim is slidably engaged with said flange so that the tabs interlock with said slots.

2. The article of furniture of claim 1 wherein said slots are grouped in pairs.

3. The article of furniture of claim 2 wherein said face means includes at least one from an angled face and a cornered face.

4. The article of furniture of claim 1 wherein said plurality of slots are defined by said rim.

5. The article of furniture of claim 4 wherein said plurality of tabs are included on said flange, said tabs lockably engaging said slots.

6. The article of furniture of claim 5 wherein said face means includes at least one of a rounded face and an angled face adapted to slide said flange over an edge of said rim.

7. The article of furniture of claim 5 wherein said tabs and said slots are arranged on said shell in an alternating sequence.

8. The article of furniture of claim 7 wherein said tabs and said slots are arranged on said substructure in an alternating sequence.

9. The article of furniture of claim 1 wherein said plurality of tabs are arranged in independent groups, each individual tab of said groups separated from other tabs in the group by a second distance at least as great as said width.

10. The article of furniture of claim 1 wherein said shell and said substructure are constructed of plastic.

11. A housing comprising:

a substructure including a first edge and defining a plurality of groups of slots, each group of slots separated from other groups by a first distance, each slot in said groups separated from other slots in said group by a second distance, said first distance greater than said second distance; and a shell including a second edge and a plurality of groups of locking tabs, each of said locking tabs including face means for slidably engaging said substructure and for sliding over a portion of said substructure before the tabs snap into and interlock with said slots, whereby said shell and substructure are secured together.

12. The housing of claim 11 wherein said shell and said substructure are constructed from plastic.

13. The housing of claim 11 wherein said groups of locking tabs, and said groups of slots are arranged in discrete pairs.

* * * * *